United States Patent Office 3,082,599
Patented Mar. 26, 1963

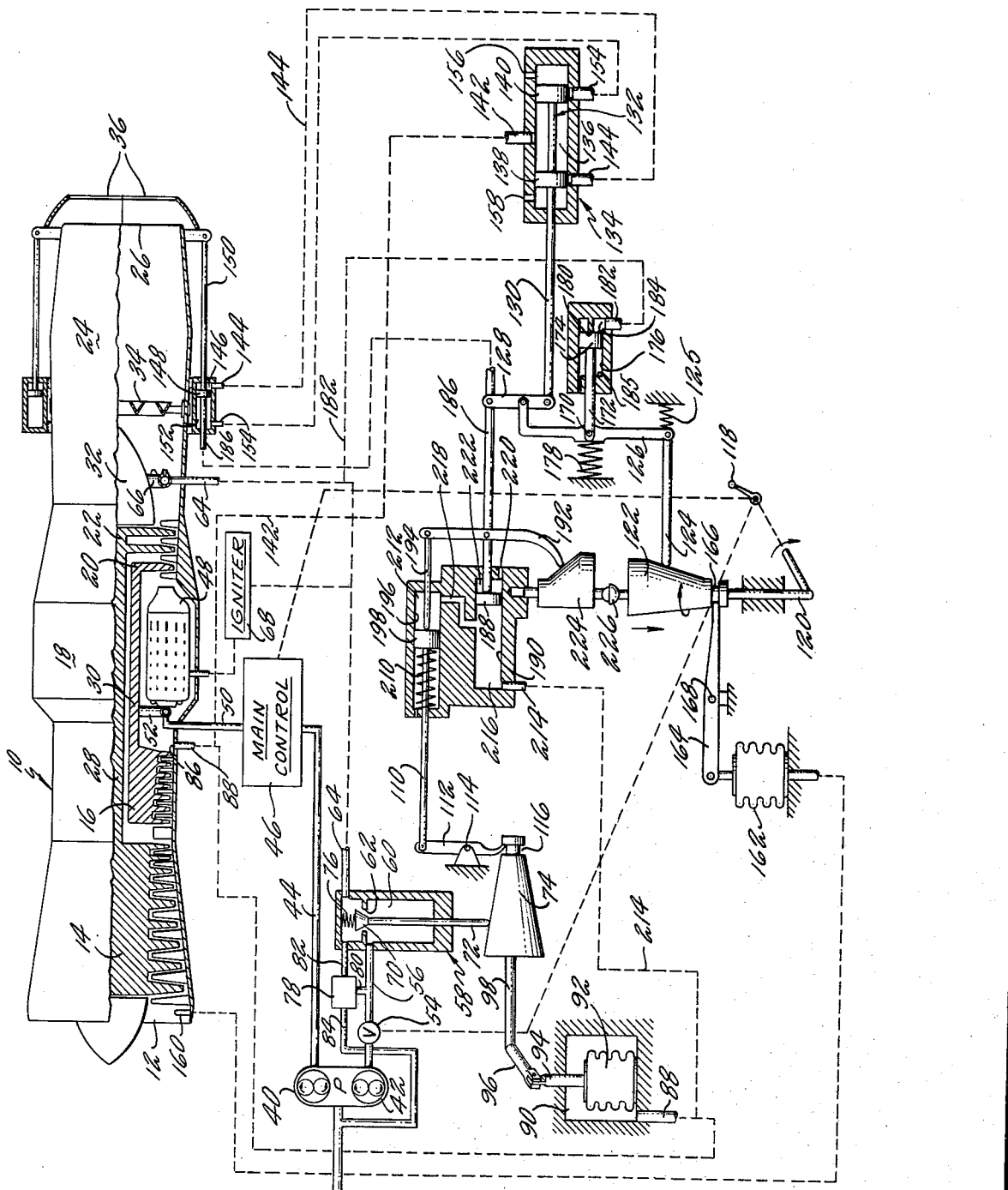

3,082,599
COORDINATED CONTROL OF AFTERBURNER FUEL AND EXHAUST NOZZLE AREA
James N. White, West Hartford, and Bruce N. Torell, Wethersfield, Conn., assignors to United Aircraft Corporation, East Hartford, Conn., a corporation of Delaware
Filed Mar. 21, 1958, Ser. No. 723,020
6 Claims. (Cl. 60—35.6)

This invention relates to multispool, afterburning gas turbine power plants, more particularly to a coordinated control of afterburner full and exhaust nozzle area for a twin-spool turbojet engine having a variable area exhaust nozzle.

An object of the invention is to provide an improved afterburner control system including an afterburner fuel control and an exhaust nozzle area control.

Another object of the invention is to provide an improved afterburner control system in which the exhaust nozzle eyelids and the afterburner fuel control are operatively interconnected and coordinately controlled.

Another object of the invention is to provide an improved afterburner control system in which afterburner fuel flow is regulated as a function of at least one engine operating parameter, exhaust nozzle area is regulated as a function of at least one other engine operating parameter, and in which afterburner fuel flow is further regulated as a function of exhaust nozzle area.

Another object of the invention is to provide an improved afterburner control system, including an operatively interconnected exhaust nozzle area control and an afterburner fuel control, in which the exhaust nozzle is partially opened for lighting the afterburner and in which a pressure signal from the afterburner fuel manifold then opens the exhaust nozzle to the desired operational position.

Another object of the invention is to provide an improved afterburner control system, including an operatively interconnected afterburner fuel control and an exhaust nozzle area control, in which a maximum value of fuel-air ratio for lighting the afterburner is provided and in which the fuel control resorts to normal metering after the exhaust nozzle opens to the desired position for afterburning.

Still another object of the invention is to provide an afterburner control system in which exhaust nozzle area is manually scheduled with a suitable compressor inlet temperature bias and in which afterburner fuel flow is regulated as a function of exhaust nozzle area, compressor discharge pressure and compressor inlet temperature.

Other objects and advantages will be apparent from the following specification and claims, and from the accompanying drawing which illustrates an embodiment of the invention.

In the drawing:

The single FIGURE shows a twin-spool, afterburning turbojet engine in combination with the afterburner control system of the invention.

Referring to the drawing in detail, the turbojet engine is indicated generally at 10, the engine having inlet 12, low pressure compressor rotor 14, high pressure compressor rotor 16, combustion section 18, high pressure turbine rotor 20, low pressure turbine rotor 22, afterburner 24 and exhaust nozzle 26 in succession in the direction of gas flow through the engine. Compressor rotor 14 is connected to turbine rotor 22 by means of shaft 28 to form a low pressure spool. Compressor rotor 16 is connected to turbine rotor 20 by sleeve 30 to form a high pressure spool, the spool surrounding shaft 28 and being coaxial therewith. Exhaust cone 32 is mounted downstream of the last stage of turbine rotor 22 at the inlet to afterburner 24. The afterburner includes flameholder 34 and eyelids 36 for varying the area of exhaust nozzle 26.

Fuel is supplied to the engine from tank 38 by pumps 40 and 42. Fuel for combustion section 18 is supplied by pump 40 through conduit 44 to main fuel control 46. From here the fuel is delivered to burner cans 48 in combustion section 18 through conduit 50 and annular manifold 52 connecting the burner cans. A suitable control for metering fuel flow to the combustion section of the engine is shown in Best Patent No. 2,822,666, issued February 11, 1958, for Turbine Power Plant Fuel Control Utilizing Speed, Temperature and Compressor Pressure.

Fuel for the afterburner is supplied by pump 42 through shutoff valve 54 and conduit 56 to afterburner fuel control 58. Valve 54 controls the admission of fuel to the afterburner fuel system and is intended to admit fuel to the control only when afterburning operation of the engine is desired. Fuel from conduit 56 enters chamber 60 within the afterburner fuel control and then flows through metering orifice 62 and delivery conduit 64 to annular manifold 66 mounted within afterburner 24 and from which the fuel is discharged into the afterburner. Hot streak afterburner igniter 68, as disclosed in Coar Patent No. 2,819,587, issued January 14, 1958, is provided for initiating combustion in the afterburner.

Afterburner fuel control 58 includes valve 70 for variably controlling the area of metering orifice 62. The valve includes stem 72, the lower end of which is maintained in contact with the surface of three-dimension fuel cam 74 by spring 76. The cam is rotated by compressor discharge pressure and translated as a function of exhaust nozzle area and by compressor inlet temperature in a manner to be described below.

For the purpose of making fuel flow to the afterburner solely a function of the effective area of metering orifice 62, the pressure drop across the orifice is maintained constant by pressure drop regulating valve 78. Such a device is shown in the above referred to Patent No. 2,822,666. Fuel pressure upstream of the metering orifice is admitted to the regulating valve by conduit 80 and fuel pressure downstream of the metering orifice is admitted to the valve by conduit 82, with the by-pass fuel being returned to the inlet of pump 42 by conduit 84.

Fuel cam 74 is rotated by compressor discharge pressure, the pressure being taken from the engine at pressure station 86 and ducted by conduit 88 to chamber 90 containing bellows 92 which may be evacuated if an absolute pressure response is desired. The free end of the bellows is connected by rod 94 to link 96 which in turn is connected to shaft 98 on which cam 74 is mounted. Expansion or contraction of the bellows in response to variations in compressor discharge pressure results in rotation of shaft 98 and cam 74 accordingly, and in displacement of valve 70 in accordance with the circumferential contouring of the cam. Cam 74 is translated along shaft 98 through an exhaust nozzle eyelid position and compressor inlet temperature input to rod 110. The rod is connected to one end of lever 112, which is pivoted at fulcrum 114, the other end of the lever engaging groove 116 at the right end of the cam. Displacement of rod 110 rotates lever 112 which in turn translates cam 74 along shaft 98 accordingly, and displaces valve 70 in accordance with the longitudinal contouring of cam 74.

Movement of power lever 118 schedules the area of exhaust nozzle 26. The lever is connected to shaft 120 on which three-dimension cam 122 is mounted and rotation of the lever rotates the cam. Follower 124 is held in contact with the surface of cam 122 by spring 125 and is connected to one end of lever 126. The opposite end of the lever is connected to the mid-point of link 128 which in turn is connected at one end to rod 130. Rod 130 is integrally connected to pilot valve 132 in servo mechanism 134.

Compressor discharge pressure is admitted to chamber 136 defined between lands 138 and 140 on pilot valve 132 by branch conduit 142 which is connected to conduit 88. Movement of power lever 118 in a nozzle area increasing direction results in translation of pilot valve 132 to the left. Land 138 uncovers passage 144 which is connected to chamber 146 at the right of power piston 148. The power piston is connected by link 150 to eyelids 36 and movement of the piston to the left as the result of admission of a motor fluid to chamber 146 will open eyelids 36 to increase exhaust nozzle area. At the same time that motor fluid is admitted to chamber 146, chamber 152 at the left of the power piston is connected through passage 154 to vent 156, movement of land 140 to the left permitting this connection. Adjustment of power lever 118 in a direction to decrease exhaust nozzle area translates pilot valve 132 to the right to admit compressor discharge pressure to passage 154 and chamber 152, and to connect chamber 146 through passage 144 to vent 158. The resultant pressure differential across power piston 148 will move the piston to the right to close eyelids 36 and reduce exhaust nozzle area.

Exhaust nozzle area also is suitably biased by compressor inlet temperature. Liquid filled, temperature sensing bulb 160 is mounted within engine inlet 12 and is connected to temperature responsive bellows 162. The free end of the bellows is connected to one end of lever 164 and the opposite end of the lever engages groove 166 in exhaust nozzle cam 122. Expansion or contraction of bellows 162 in response to variations in compressor inlet temperature rotates lever 164 about pivot 168 to translate cam 122 along shaft 120, which in turn results in movement of follower 124 and actuation of servo mechanism 134 to vary exhaust nozzle area accordingly.

The mid-point of lever 126 is pivotably connected at fulcrum 170 to rod 172 which is connected to piston 174 in bore 176. During non-afterburning operation of engine 10 spring 178 loads lever 126, rod 172 and piston 174 to the right with the piston abutting stop 180 and with fulcrum 170 assuming a relatively fixed position. When afterburner operation is desired and afterburner fuel has been admitted to delivery conduit 64 and afterburner manifold 66, afterburner manifold pressure is admitted by branch conduit 182 to chamber 184 at the right of piston 174. This pressure forces the piston and lever 126 to the left with the piston abutting stop 185 and with fulcrum 170 assuming another relatively fixed position where it will remain during afterburner operation.

Link 128 is pivotably connected to an intermediate portion of rod 186, one end of which is operatively connected to power piston 148 so that the rod is actuated whenever the eyelids are moved. The other end of rod 186 is connected to slide valve 188 in bore 190, as well as through intermediate structure to afterburner fuel control 58. The combination of rod 186, link 128 and rod 130 is the feedback to exhaust nozzle servomechanism 134, and the combination of the rod and intermediate structure to be described is an input signal from the eyelids to the afterburner fuel control.

Lever 192 is pivotably connected between its ends to an intermediate portion of rod 186. One end of the lever is connected to rod 194 which extends into bore 196 to contact the right face of piston 198 therein. The piston is mounted on rod 110 connected to fuel cam 74, and the rod and piston combination are urged to the right in bore 196 by spring 210. Slide valve 188 controls the admission of compressor discharge pressure to chamber 212 at the right of piston 198. Compressor discharge pressure is ducted from conduit 88 by branch conduit 214 to chamber 216 at the left of slide valve 188 and then may be admitted through passage 218 to chamber 212 depending upon the position of slide valve 188. Vent 220 connects chamber 222 at the right of slide valve 188 to the atmosphere or to some other suitable low pressure.

The end of lever 192 opposite to that connected to rod 194 is in the form of a follower which rides on the surface of temperature cam 224. This cam is operatively connected to exhaust nozzle cam 122 and compressor inlet temperature actuated lever 164 so that both cams are translated in accordance with variations of compressor inlet temperature. However, coupling 226 between the two cams permits cam 122 to be rotated by power lever 118 without a corresponding adjustment of cam 224. While cam 224 is shown as a two-dimension cam it could be contoured in a circumferential sense so that a rotational input to the cam could be achieved if desired.

The surface of each of cams 122 and 224 may be suitably contoured so that during a certain range of engine operation for various compressor inlet temperatures the area of the exhaust nozzle and the fuel air ratio are controlled by power lever position alone, by power lever position and by compressor inlet temperature, or they may be held constant. Further, for another range of engine operation for the same compressor inlet temperature variations, the cam contouring may maintain exhaust nozzle area and fuel air ratio constant or either may be varied as a function of compressor inlet temperature only.

*Operation*

Control of engine 10 is accomplished by rotation of power lever 118. During non-afterburning operation, rotation of the power lever actuates main fuel control 46 to regulate fuel flow to combustion section 18. When afterburning is desired, the power lever is advanced into the afterburning range which rotates exhaust nozzle cam 122 to an effective position and which opens valve 54 to admit fuel to the afterburner fuel system.

Rotation of cam 122 by power lever 118 actuates follower 124 and its associated linkage to translate pilot valve 132 to the left, admitting compressor discharge pressure to the right of power piston 148 and venting chamber 152 at the left of the piston. The pressure differential across the piston will open eyelids 36 to increase exhaust nozzle area. Motion of the eyelids is transmitted through rod 186 and link 128 to return pilot valve 132 to its null position.

During non-afterburning operation fulcrum 170 for lever 126 is maintained in a position to the right by spring 178 with the result that eyelids 36 are in a fully closed position, and the fulcrum is in this position when afterburning operation is initiated. In a well-known manner, cam 122 is provided with a flat longitudinal portion which is in contact with follower 124 during non-afterburning operation so that variations in compressor inlet temperature will not vary exhaust nozzle area during non-afterburning operation. The admission of fuel to afterburner delivery conduit 64 and manifold 66 also admits fuel to branch conduit 182 and chamber 184 at the right of piston 174. This pressure shifts the fulcrum to its far left position to further open the eyelids upon the onset of fuel flow to the afterburner. The control system is so designed that when afterburning operation is desired, actuation of power lever 118 opens eyelids 36 to a preliminary position in anticipation of the initiation of afterburner operation, after which fuel is admitted to the afterburner and ignited, and then eyelids 36 are further opened to the desired position for operation in response to increased afterburner fuel manifold pressure resulting from afterburner ignition. This final increase in area is accomplished through shifting of fulcrum 170.

Motion of eyelids 36, in addition to being fed back to servo mechanism 134, also is transmitted through lever 192, rods 194 and 110 and lever 112 to afterburner fuel cam 74. A change in the position of the eyelids results in translation of the cam to regulate afterburner fuel flow in accordance with exhaust nozzle area.

Compressor inlet temperature as sensed by bulb 160 and bellows 162 translates exhaust nozzle cam 122 and temperature cam 224. Translation of cam 122 actuates follower 124 to shift pilot valve 132 and admit motor fluid to power piston 148 to vary nozzle area accordingly. Translation of cam 224 rotates lever 192 about its connection with rod 186 to move rods 194 and 110 and translate fuel cam 74. Thus, exhaust nozzle area is scheduled by power lever position and by compressor inlet temperature, and the longitudinal position of fuel cam 74 may be determined by exhaust nozzle area and compressor inlet temperature.

When shut-off valve 54 is opened for afterburner operation, fuel is admitted to chamber 60 in afterburner fuel control 58. The amount of fuel flowing from this chamber to the after burner is determined by the effective area of metering orifice 62. This area is determined by the position of valve 70 which is actuated by fuel cam 74. As has been explained above, the cam is translated as a function of exhaust nozzle area and compressor inlet temperature. In addition, the valve is rotated by expansion and contraction of bellows 92 as a function of compressor discharge pressure. Thus afterburner fuel flow is a combined function of exhaust nozzle area, compressor inlet temperature and compressor discharge pressure.

In order to provide a maximum value of fuel-air ratio for lighting the afterburner, compressor discharge pressure is admitted when eyelids 36 are closed through branch conduit 214 to chamber 212 at the right of piston 198. The spring chamber at the left of the piston is vented with the result that the relatively high pressure in chamber 212 moves the piston and rod 110 to the left compressing the spring. This movement translates cam 74 to the right to open valve 70 to the position for maximum fuel-air ratio. However, as the eyelids open, the resulting translation of rod 186 moves piston 188 to the left. As the eyelids advance beyond a predetermined position, the piston closes off the entrance to passage 218 from chamber 216, cutting off compressor discharge pressure from chamber 212 and connecting the chamber to vent 220. The force of spring 210 urges piston 198 to a position contacting rod 194 so that the translational position of fuel cam 74 is dependent upon eyelid position and compressor inlet temperature.

It is to be understood that the invention is not limited to the specific embodiment herein illustrated and described, but may be used in other ways without departure from its spirit as defined by the following claims:

We claim:

1. In combination with a turbojet engine having a compressor, an afterburner and a variable area exhaust nozzle, an afterburner system including a power lever for the selection of after burning operation, exhaust nozzle control means, and after burner fuel control means including valve means variable between full open and full closed positions, means responsive to power lever position and an engine temperature for actuating said exhaust nozzle control means to schedule exhaust nozzle area, means responsive to area variation of said exhaust nozzle, an engine pressure and an engine temperature for actuating said fuel control means to regulate afterburner fuel flow, and means positioning said valve means in the full open position upon the selection of afterburner operation.

2. An afterburner control system for a turbojet engine having an afterburner and a variable area exhaust nozzle, said system including means maintaining a fixed area of said exhaust nozzle during nonafterburning operation, means for selecting afterburner operation, means for delivering fuel to said afterburner, means for igniting fuel in said afterburner, means actuated by said selecting means upon the selection of afterburning operation for effecting a partial opening of said exhaust nozzle prior to ignition of said afterburner including a variable position pivot normally in a first position, and means responsive to after burner fuel pressure for shifting said pivot to a second position to establish an increased opening of said exhaust nozzle.

3. The control system as in claim 2 wherein the means for delivering fuel to said afterburner includes a supply conduit having valve means therein variable between full open and full closed positions, and including means for establishing the full open position of said valve means upon the selection of fuel to said afterburner.

4. An afterburner control system for a turbojet having an afterburner and a variable area exhaust nozzle, said system including means maintaining a fixed area of said exhaust nozzle during nonafterburning operation, means for selecting afterburner operation, means including a conduit having valve means therein for delivering fuel to said afterburner, means actuated by said selecting means upon the selection of afterburner operation for effecting a partial opening of said exhaust nozzle prior to the delivery of fuel to said afterburner including a variable position pivot normally in a first position, means responsive to afterburner fuel pressure for shifting said pivot to a second position to establish an increased exhaust nozzle area, and means for establishing a full open condition of said valve means upon the selection of afterburner operation.

5. In a jet reaction propulsion vehicle having an afterburner and a variable area exhaust nozzle, a control system including means for maintaining a fixed exhaust nozzle area during nonafterburning operation, means for delivering fuel to said afterburner, means for selecting the delivery of fuel to said afterburner, means actuated by said selecting means for establishing a partial opening of said exhaust nozzle prior to the delivery of fuel to said afterburner, and means responsive to pressure of the fuel flowing to said afterburner to increase the amount of the opening of said exhaust nozzle.

6. In combination with a turbojet engine having a compressor, an afterburner and a variable area exhaust nozzle, an afterburner system including a power lever for selecting afterburning operation, means maintaining a fixed area of said exhaust nozzle during nonafterburning operation, afterburner fuel control means, means for igniting said afterburner, means actuated by movement of said power lever to the afterburning position for establishing a partial opening of said exhaust nozzle prior to ignition of said afterburner, means responsive to the ignition of fuel in said afterburner for establishing a further opening of said exhaust nozzle, means responsive to power lever position and an engine temperature for varying exhaust nozzle area during afterburning operation, and means responsive to area variations of said exhaust nozzle, an engine pressure and an engine temperature for actuating said fuel control means to regulate afterburner fuel flow.

References Cited in the file of this patent

UNITED STATES PATENTS

| | | |
|---|---|---|
| 2,520,434 | Robson | Aug. 29, 1950 |
| 2,683,348 | Petry | July 13, 1954 |
| 2,713,767 | Alford | July 26, 1955 |
| 2,720,078 | Day | Oct. 11, 1955 |
| 2,726,507 | Baker | Dec. 13, 1955 |
| 2,736,166 | Mock | Feb. 28, 1956 |
| 2,747,363 | Cohen | May 29, 1956 |
| 2,774,215 | Mock et al. | Dec. 18, 1956 |
| 2,867,082 | Colley | June 6, 1959 |
| 2,984,969 | Torell | May 23, 1961 |
| 3,014,676 | Arnett | Dec. 26, 1961 |
| 3,019,597 | German | Feb. 6, 1962 |

FOREIGN PATENTS

| | | |
|---|---|---|
| 205,249 | Australia | Jan. 9, 1957 |
| 1,061,753 | France | Dec. 2, 1953 |
| 768,042 | Germany | May 26, 1955 |
| 760,806 | Great Britain | Nov. 7, 1956 |